United States Patent [19]

Hieda et al.

[11] Patent Number: 4,782,394
[45] Date of Patent: Nov. 1, 1988

[54] IMAGE PICKUP APPARATUS HAVING SATURATION PREVENTION CONTROL MODES

[75] Inventors: Teruo Hieda, Yokohama; Yoshiaki Hirano, Kawagoe, both of Japan

[73] Assignee: Canon Kabushiki Kaisha, Tokyo, Japan

[21] Appl. No.: 865,789

[22] Filed: May 22, 1986

[30] Foreign Application Priority Data

Jun. 3, 1985 [JP] Japan ............................ 60-120079
Jun. 20, 1985 [JP] Japan ............................ 60-134833
Jul. 29, 1985 [JP] Japan ............................ 60-166967

[51] Int. Cl.$^4$ ............................................. H04N 3/14
[52] U.S. Cl. .............................. 358/213.19; 358/213.31
[58] Field of Search .............. 358/213.19, 213.26, 358/213.31

[56] References Cited

U.S. PATENT DOCUMENTS

| | | | |
|---|---|---|---|
| 3,931,463 | 1/1976 | Levine | 178/7.1 |
| 3,944,876 | 3/1976 | Helmuth | 315/205 |
| 4,038,690 | 7/1977 | Hoagland | 358/213 |
| 4,245,164 | 1/1981 | Funahashi | 307/221 |
| 4,302,779 | 11/1981 | Inoue | 358/213 |
| 4,322,753 | 3/1982 | Ishihara | 358/213 |
| 4,430,672 | 2/1984 | Berger | 358/213 |
| 4,455,574 | 6/1984 | Hashimoto et al. | 358/213 |
| 4,472,744 | 9/1984 | Inoue et al. | 358/293 |
| 4,485,405 | 11/1984 | Bailey | 358/213 |
| 4,498,105 | 2/1985 | Crawshaw | 358/213 |
| 4,609,825 | 9/1986 | Berger | 358/213 |
| 4,622,596 | 11/1986 | Suga et al. | 358/335 |
| 4,644,403 | 2/1987 | Sakai et al. | 358/213 |
| 4,647,978 | 3/1987 | Kinoshita | 358/213 |
| 4,651,215 | 3/1987 | Bell | 358/213 |
| 4,663,669 | 5/1987 | Kinoshita et al. | 358/213.19 |

*Primary Examiner*—Jin F. Ng
*Assistant Examiner*—Stephen Brinich
*Attorney, Agent, or Firm*—Fitzpatrick, Cella, Harper & Scinto

[57] ABSTRACT

Disclosed is a method and a system for picking up an image by means of electrical charge generation and accumulation. In the disclosed method and system, to shorten the actual or substantial charge integration period, the charges are once cleared off as unwanted charges from the imaging part of an image pickup element before reading out of the wanted charges from the pickup element. The image pickup element further has a signal erasure part for erasing the excess charges generated at the imaging part. This erasure part, according the disclosed method and the system, is operated before the clearing off of the unwanted charges as well as after the clearing off of the unwanted charges. Thus, it is possible to prevent the unwanted charges from overflowing and affecting the wanted charges to be read out but also possible to reduce the stored quantity of the unwanted charges to be eliminated.

113 Claims, 10 Drawing Sheets

IMAGE PICKUP APPARATUS HAVING SATURATION PREVENTION CONTROL MODES

BACKGROUND OF THE INVENTION

1. Field of the Invention

The present invention relates to an image pickup method and system and more particularly to an image pickup method and system which are suited for picking up an image of a rapidly moving object.

2. Description of the Prior Art

In connection with the use of solid-state imaging devices such as CCD's (charge coupled devices) in television cameras, it has been proposed to make the integration period of the solid-state imaging device shorter than the field (or frame) period of the television signals by changing the method or manner of driving the imaging device. As an example, in the Japanese patent application No. 61098/1983 (laid open dated Oct. 22, 1984, No. 185475/1984 corresponding U.S. patent application Ser. No. 596,404, filed Apr 3, 1984), there is disclosed a drive method by which, in a frame-transfer type CCD, charges generated at an imaging part of the CCD are forcibly eliminated or cleaned off from the imaging part by being vertically transferred to a storage part at a particular time during the field period. The remainder of the field period is then utilized as a substantial integration period.

According to the above described method, in an NTSC television system, though the normal integration period is 1/60 second, this integration period can be changed to 1/120 or 1/500 second. With this integration period shortening method, the aperture size does not need to be decreased when a large quantity of incident light reaches the imaging part of the CCD. On the other hand, if the object brightness does not change, the diaphragm aperture is automatically opened with the shortened integration period; and an out-of-focus effect, in which only the focused object is sharply imaged, is obtained due to the shallowed depth of field. Also, with shortened integration period it is possible to pick up the image of a rapidly-moving object without any blur.

However, if the substantial integration period is shortened, the diaphragm must be opened more than during the normal integration period, in order to gain a video signal level equal to the level obtained in the normal integration period (1/60 second), so thataa large quantity of light easily enters the lens. Consequently, charges are easily generated in the CCD image part, making the image prone to blooming.

The prior art also includes drain type anti-blooming arrangements in CCD3 s which cause excess accumulated charges in various cells to be drained away from the device so that the excess charge does not flow into adjacent cells. The prior art further includes control signal responsive anti-blooming means for CCD's which operate to produce charge reductions in particular cells of the CCD according to the control signal.

SUMMARY OF THE INVENTION

The present invention provides methods and apparatus which improves upon the above described prior art. With the present invention anti-blooming is improved even when a substantial integration period is shortened. Also the invention permits shortening of the substantial integration period and improved efficiency of electrical charge elimination; and it permits a clear screen free from noise even when the substantial integration period is shortened.

According to one aspect of the invention there is provided an image pickup apparatus which comprises converting means for converting an image into an electrical signal; means operative in response to a control signal for preventing saturation of the converting means; driving means having a first mode, which allows the converting means to operate in such a manner as to eliminate the electrical signal which is subjected to conversion by the converting means, and a second mode, which allows the converting means to operate in such a manner as to deliver the electrical signal to the outside of the image pickup apparatus; and generating means for generating the control signal in accordance with the first and second modes of said driving means.

In another aspect, the invention provides a drive device for an image pickup apparatus having converting means for converting an image into an electrical signal and a means for preventing saturation of the converting means in response to a control signal. The drive device comprises driving means having a first mode which allows the converting means to eliminate the electrical signal and a second mode which allows the converting means to deliver the electrical signal to the outside of the image pickup apparatus; and generating means for generating the control signal in accordance with the first and second modes of the driving means.

The invention in a further aspect involves an image pickup apparatus comprising converting means for converting an image into an electrical signal, the converting means having the function of accumulating the electrical signal; driving means having a first mode which allows the converting means to eliminate the electrical signal and a second mode which allows the converting means to deliver said electrical signal to the outside of the image pickup apparatus; and controlling means for controlling the accumulation function of the converting means in accordance with the first and second modes of the driving means.

The invention involves, in a further aspect, a drive device for an image conversion apparatus having a converting means which includes the function of converting an image into an electrical signal and accumulating the electrical signal The drive device comprises driving means having a first mode which allows the converting means to eliminate the electrical signal and a second mode which allows the converting means to deliver the electrical signal to the outside of the image conversion apparatus; and controlling means for controlling the accumulation function of the converting means in accordance with the drive modes of the driving means.

In another aspect of the invention there is provided an image pickup apparatus comprising converting means for converting an image contained in one screen into a plurality of electrical signals. The converting means is constructed to produce the electrical signals within each field period of a standard television signal. There is also provided controlling means for transferring the electrical signals for one screen a plurality of times during each vertical blanking period which substantially coincides with each field period.

In still another aspect, the invention involves an image pickup apparatus which comprises converting means for converting an image contained in one screen into a plurality of electrical signals. The converting means is constructed to generate electrical signals within each field period of a standard television signal. A storage means is provided for storing the electrical signals for one screen and controlling means are provided for controlling the converting means and the storage means. The controlling means operates to transfer the electrical signals for one screen from the converting means to the storage means a plurality of times during each vertical blanking period which substantially corresponds with each field period.

In a still further aspect, the invention comprises a drive device for a device having a converting means for converting an image contained in one screen into a plurality of electrical signals. The drive device comprises first means for producing the electrical signals within each field period of a standard television signal. The drive device further comprises second means for transferring a plurality of times during each vertical period which substantially coincides with each field period, the electrical signal into which the image for one screen has been converted.

According to another aspect of the present invention, there is provided an image pickup method comprising the steps of: exposing a charge accumulation image pickup means to an image in a first time period to generate and accumulate a first electrical charge; clearing the first electrical charge from said image pickup means without generating an electrical output signal; after such clearing, exposing the image pickup means to an image in a second time period to generate a second electrical charge; generating an electrical signal corresponding to the second electrical charge; and, during at least one of the time periods operating a charge reduction device to reduce the amount of charge accumulated by the image pickup means.

According to another aspect of the present invention, there is provided an image pickup system comprising an image pickup means and drive means. The image pickup means has generation means to generate an electrical signal in response to an optical image and anti-blooming means which operates in response to a control signal to reduce the charge accumulated by the generation means for preventing the signal from overflowing at the generation means. The drive means provides four control signals to drive the image pickup means. The first control signal clears off the signal from the generation means. The second control signal reads out the signal from the pickup means. The third control signal operates the anti-blooming means before the reading out of the signal from the pickup means. The fourth control signal operates the anti-blooming means before the clearing off of the signal from the generation means.

By operating the anti-blooming means before the clearing off of the signal from the generation means, it is not only possible to prevent the unwanted signal (to be eliminated) from overflowing and affecting the wanted signal (to be read out) but it is also possible to reduce the stored quantity of the unwanted signal to be eliminated so that the unwanted signal can be easily eliminated from the generation means. Thus, it becomes possible to obtain a high quality image pickup or video signal with a shortened signal integration period and free from noise.

According to another aspect of the present invention, there is provided a method of producing a series of field video signals. This method comprises the steps of receiving an optical image with an image pickup element having a signal generation part for generating an electrical signal in response to the received image and for accumulating the generated signal at potential cells, repeatedly reading out the signal from the pickup element at a time interval substantially corresponding to a field period of the field video signal, clearing off the signal from the generation part of the pickup element prior to each read-out of the signal from the pickup element in the second step, and forming at the generation part of the pickup element, first and second potential cells, respectively, before and after the clearing off, wherein a total capacity for the signal accumulation of the first cells is larger than that of the second cells.

According to yet another aspect of the present invention, there is provided an image pickup system comprising an image pickup means and drive means. The image pickup means has generation means to generate an electrical signal in response to an optical image for accumulating the generated signal at potential cells. The drive means provides four control signals to drive the image pickup means. The first control signal clears off the signal from the generation means. The second control signal reads out the signal from the pickup means. The third control signal causes the generation means to form first potential cells from the start of the signal read-out to the signal clearing off. The fourth control signal causes the generation means to form second potential cells from the signal clearing off to the start of the signal read-out, wherein a total capacity for the signal accumulation of the first cells is larger than that of the second cells.

By increasing the total capacity for the signal accumulation of the generation means at the time of accumulation of the unwanted signal (to be eliminated), it is possible to reduce the likelihood of overflowing of the unwanted signal and affecting the wanted signal (to be read out). Thus, it becomes possible to obtain a high quality image pickup or video signal with a shortened signal integration period and free from noise.

According to a further aspect of the present invention, there is provided a method of producing a series of field video signals, comprising the steps of receiving an optical image with an image pickup element having a signal generation part for generating and accumulating an electrical signal in response to a received image, repeatedly reading out the signal from the pickup element at a time interval substantially corresponding to a field period of the field video signal, clearing off the signal from the generation part of the pickup element prior to each read-out of the signal from the pickup element, controlling at least the timing of the clearing off so that the time interval between the third step and the start of the next signal read-out in the second step approximately corresponds to a vertical blanking period between two field video signals.

According to another aspect of the present invention, there is provided an image pickup system comprising an image pickup means, drive means and control means. The image pickup means has generation means for generating and accumulating an electrical signal in response to an optical image. The drive means drives the pickup means to periodically read out the signal from the pickup means at a time interval substantially corresponding to a field period of a field video signal. The drive means also drives the pickup means to clear off the signal from the generation means prior to each read-out of the signal. The control means is connected to the drive means to control at least the timing of clearing off the signal so that the time interval between clearing off the signal and the start of the next signal read-out approximately corresponds to a vertical blanking period between two field video signals.

By making the shortened integration period approximately correspond to a vertical blanking period between two field video signals, it becomes possible to conceal, from the display on the monitor, the noise bar caused by clearing off the signal.

The above and other aspects, features and advantages of the present invention will become apparent from the following description of the preferred embodiments thereof, taken in conjunction with the accompanying drawings.

DETAILED DESCRIPTION OF THE PREFERRED EMBODIMENTS

Preferred embodiments of the present invention will be described below with reference to the accompanying drawings.

At first, description will be made below of a first preferred embodiment of this invention in which a frame transfer type CCD is used as an imaging means, by way of example.

Figure 1:
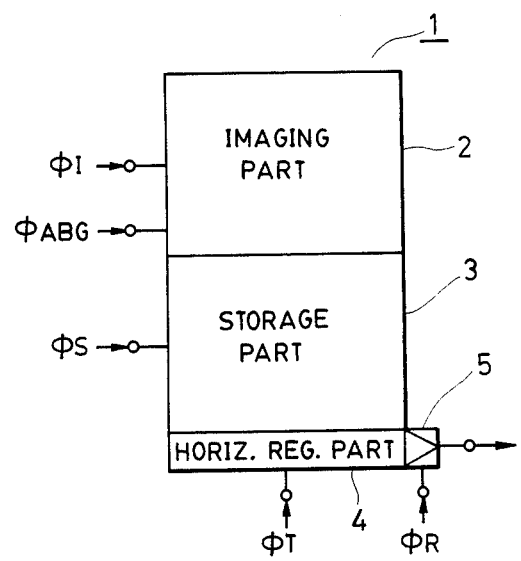
FIG. 1 is a schematic illustration of a frame-transfer type CCD which is used in a first embodiment of the present invention.

Referring to FIG. 1, there is shown a frame-transfer type CCD 1, which may be used in the first embodiment (described hereinafer). The frame transfer type CCD 1 includes an imaging part 2 for generating and accumulating electrical signals or electrical charges in response to incident light, a storage part 3 for taking in and temporarily storing the electric charges generated and accumulated in the imaging part 2, a horizontal register part 4 for seguentially reading out each line of the charges stored in the storage part 3 and an output amplifier 5 which is disposed on the output side of the horizontal register part 4 and converts the electrical charges into electrical signals or electrical voltages.

As is well known, the imaging part 2 has a two-dimensional arrangement of a plurality of image pickup cells which are disposed or arrayed in predetermined columns and rows. The storage part 3 also has a two-dimensional arrangement of a plurality of storage cells which are disposed or arrayed in columns and rows corresponding to the columns and rows of the image pickup cells in the imaging part 2. The horizontal register part 4 has a one-dimensional arrangement of a plurality of charge-transfer cells which are disposed so as to correspond to the storage cell columns in the storage part 3. The CCD 1 is shielded from light except for a predetermined image receiving area of the imaging part 2.

When driving the above mentioned CCD 1 to produce a television signal, the charges generated and accumulated in the imaging part 2 are transferred vertically from the imaging part 2 to the storage part 3 during the vertical blanking period. The charges stored in the storage part 3 are then transferred to the horizontal register part 4 on a line-by-line basis during the horizon blanking period.

The charges transferred to the horizontal register part 4 are transferred horizontally to the output amplifier 5 during one horizontal line period. Symbol $\phi T$ denotes horizontal register driving pulses which drive the horizontal register part 4, and symbol $\phi R$ denotes reset-gate driving pulses which are applied to the output amplifier 5.

The description below concerns a single phase CCD with an anti-blooming-gate system.

Figure 2:
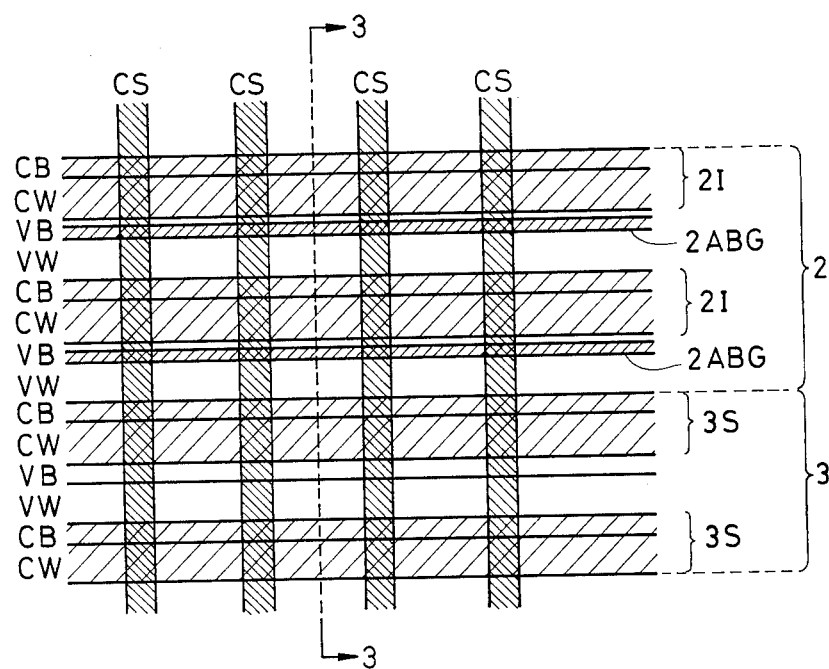
FIG. 2 is a schematic illustration, in plan view, of one example of the construction of certain portions of the CCD shown in FIG. 1.

FIG. 2 shows one example of the construction of a portion of the CCD 1 in the region of the boundary between the imaging part 2 and the storge part 3.

As shown in FIG. 2, there are provided channel stoppers CS for separating horizontal picture elements from each other, electrodes 2I for driving the imaging part 2, anti-blooming gate electrodes 2ABG, electrodes 3S for driving the storage part 3, clocked barrier regions CB, clocked well regions CW, virtual barrier regions VB and virtual well regions VW.

Figure 3:
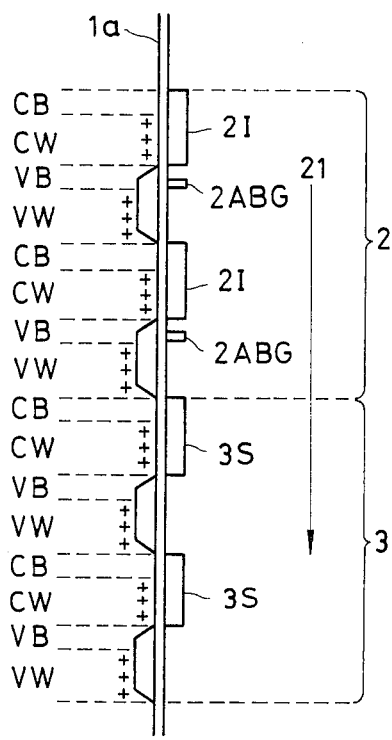
FIG. 3 is a section view taken along line 3—3 of FIG. 2.

FIG. 3 is a cross-sectional view taken along the line 3—3 of FIG. 2. In this figure, the electrodes 2I, 2ABG and 3S are formed of polysilicon or the like on an insulation layer 1a such as $SiO_2$. A virtual phase potential is formed in each of the regions VB and VW owing to positive-ion implantation, and in addition, negative ions are implanted in such a manner that a potential distribution such that CB>CW, VB>VW is formed (here A>B means that A is higher than B in potential). An arrow 21 indicates the direction of charge transfer in the CCD 1.

Figure 4:
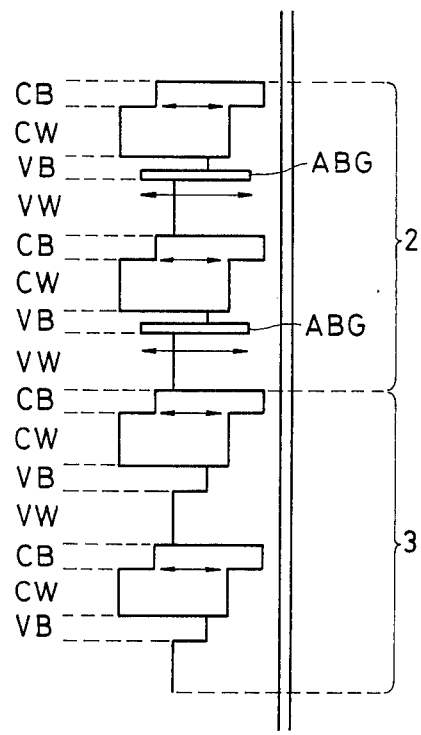
FIG. 4 is a schematic illustration corresponding to FIG. 3, but showing changes in potential distribution within the CCD when it is driven.

FIG. 4 shows a change in the potential distribution in the CCD 1 where the regions VB and VW are fixed at their respective virtual phase potentials, and the potentials of the regions CB, CW and ABG are varied by drive voltages. The symbols ABG denote anti-blooming gate regions corresponding to the electrodes 2ABG.

Figure 5:
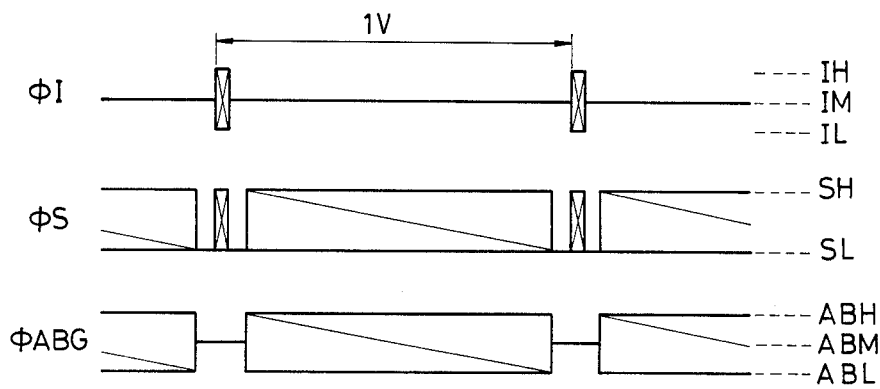
FIG. 5 is a timing chart for drive pulses used in a first video mode of operation of the CCD of FIG. 1.

FIG. 5 shows a timing chart for drive pulses used in a first mode of operation of the CCD 1. In FIG. 5, IV denotes a vertical (or TV field) period.

A vertical transfer pulse $\phi I$ is applied to the electrodes 2I (FIG. 2) at the beginning of each vertical period IV. Then the signal level at the electrodes 2I returns to a middle level IM during a charge accumulation or integration period within the vertical period IV. In this case, the potentials at the regions CW and VW are substantially the same, and charges are accumulated in both the regions CW and VW. Each pair of the thus-accumulated charges in the regions CW and VW are automatically added in the direction of transfer 21 (in FIG. 3) during a transfer period. In accordance with this embodiment, the pair of charges to be added in each field at a time are shifted alternatively, to shift the sensitivity center of each horizontal scanning line, thereby effecting an interlaced scanning operation.

On the other hand, vertical transfer pulses $\phi S$ are applied to the electrodes 3S in accordance with the application of the transfer pulses $\phi I$ to the electrodes 2I, so that charges are vertically transferred from the imaging part 2 to the storage part 3. Subseguently, a charge transfer is conducted from the storage part 3 to the horizontal register part 4 on a line-by-line basis with each shift pulse at the beginning of each horizontal period 1H During the vertical transfer of the charges from the imaging part 2 to the storage part 3, the regions ABG are fixed at a predetermined intermediate potential ABM between the virtual potentials of the regions VB and VW so as to permit vertical charge transfer. During the other periods, anti-blooming pulses $\phi ABG$ at a frequency in the order of 500 KHZ to 2 MHZ are intermittently applied during each horizontal blanking period, thereby eliminating unwanted charge of a predetermined level or higher by charge recombination which is well known in the art.

Referring further to FIG. 5, in which the vertical axis denotes the level of each pulse and the horizontal axis denotes time, each pulse is a high-frequency pulse as described above. The rectangles with crossed diagonal lines represent continuously applied high frequency pulses such as the pulses $\phi I$. The rectangles with single diagonal lines represent pulses which are applied only intermittently, e.g. at each horizontal blanking period, such as the pulses $\phi ABG$. As can be seen, the pulses $\phi S$ are applied both continuously and intermittently.

A known method of eliminating unwanted charge by charge recombination is disclosed in detail in Japanese patent application No. 75838/1983 laid open dated Nov. 15, 1984, No. 201586/1984 (corresponding U.S. patent application Ser. No. 602,731 filed Apr. 23, 1984). In such case the electrodes 2 ABG are driven to raise part of the accumulated charges to the potential of a recombination center whereby they become recombined with holes and are eliminated or cancelled.

Figure 6:
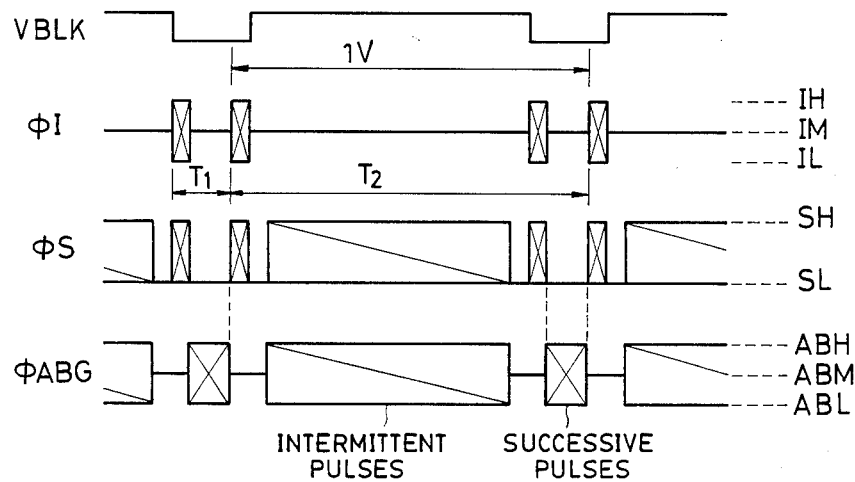
FIG. 6 is a timing chart for drive pulses used in a second mode of operation of the CCD of FIG. 1.

FIG. 6 shows a timing chart for drive pulses in a second mode of operation of the CCD 1. In this case the charges are vertically transferred part way along the integration so as to decrease the substantial integration period, i.e., to obtain an electronic shutter effect. When compared with the pulses $\phi I$ and $\phi S$ shown in FIG. 5, the vertical transfer pulses $\phi I$ and $\phi S$ are applied to the electrodes 2I and 3S at a certain timing during one vertical period IV, preferably, near the beginning of the vertical blanking period VBLK (i.e. during the low level period of a vertical blanking pulse VBLK), so that the charges accumulated during a period $T_2$ are eliminated and a remaining period $T_1$ of one vertical period 1V becomes a substantial integration period. The voltage level of the pulses $\phi ABG$ is temporarily maintained at the middle level ABM during the vertical transfer periods.

Figure 7:
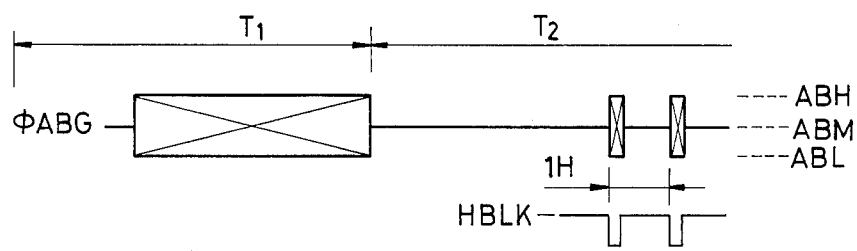
FIG. 7 is a timing chart for anti-blooming gate pulses shown in FIG. 6.

FIG. 7 shows details of the waveform of the anti-blooming pulses $\phi ABG$ in the second mode, i.e., when operating the electronic shutter.

As described above, the charges accumulated during the period $T_2$ are not used and are eliminated, while the charges accumulated during the following period $T_1$ are read out and used. Thus, in this case the period $T_1$ is a substantial integration period. When a large quantity of charge is accumulated during the period $T_2$, even if charge transfer is carried out at some intermediate point, the unwanted charges may not be completely eliminated, so that a certain quantity of harmful charge may remain in the imaging part 2. For this reason, in this embodiment, the anti-blooming gate pulses $\phi ABG$ are applied to the electrode 2ABG intermittently, i.e., during each horizontal blanking period HBLK, (which is the low level period of a horizontal blanking pulse HBLK shown in FIG. 7) so as to reduce the quantity of charge to be accumulated during the period $T_2$. Furthermore, during the substantial integration period $T_1$, it is preferable to successively apply the anti-blooming gate pulses $\phi ABG$ to the electrode 2ABG to prevent blooming. It is possible to vary the anti-blooming ability or power by changing the frequency and/or amplitude of the anti-blooming gate pulses $\phi ABG$ to be applied to the electrode 2ABG. Either method may be adopted, depending on circumstances. Here, if the anti-blooming gate pulses $\phi ABG$ are successively applied to the electrode 2ABG during the long period $T_2$, noise would be introduced at the output amplifier 5 and would harm the displayed image on the screen. This would also be disadvantageous in terms of power consumption because of the successive high frequency pulses. To solve this problem, in this embodiment, the anti-blooming gate pulses $\phi ABG$ are applied intermittently, i e., only during each horizontal blanking period in the period $T_2$. Applying the anti-blooming gate pulses $\phi ABG$ only during each horizontal blanking period is advantageous, since the noise due to the pulses $\phi ABG$ is concentrated in the horizontal blanking period and therefore the displayed image is not harmed.

Figure 8:
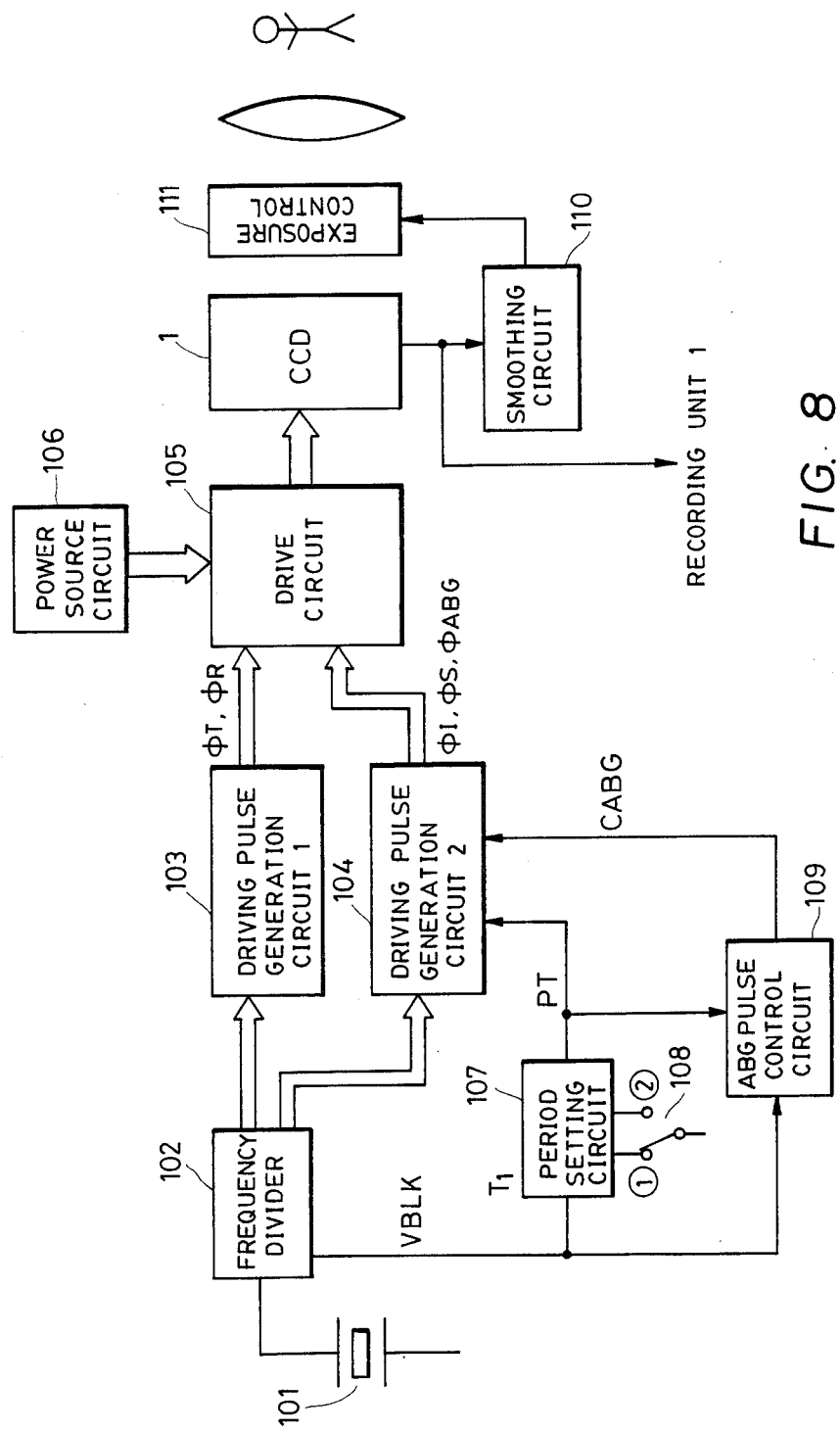
FIG. 8 is a block diagram of a first embodiment of the present invention.

FIG. 8 shows one example of the construction of the first embodiment of the present invention. As shown, a crystal oscillator 101 is connected to a frequency divider 102 which in turn is connected to first and second driving pulse generating circuits 103 and 104. The first pulse generating circuit 103 generates the pulses $\phi T$ and $\phi R$ shown in FIG. 1 and the second pulse generating circuit 104 generates the pulses $\phi I$, $\phi S$ and $\phi ABG$. A drive circuit 105 is connected to receive the pulses $\phi T$ and $\phi R$. A power source circuit 106 is arranged to generate voltages for driving each constituent element. A period setting circuit 107 is connected to receive VBLK from the frequency divider 102. An integration mode selecting switch 108 assigns the first mode when connected to a terminal ①and the second mode when connected to a terminal ② An ABG pulse control signal generating circuit 109 is connected to receive VBLK from the frequency divider 102 and to receive outputs PT from the period setting circuit 107. A smoothing circuit 110 is arranged for smoothing the output of the CCD 1 and an exposure control member 111. The exposure control member 111 includes a diaphragm, a shutter or the like (not shown) for controlling the exposure of the CCD 1.

The oscillation output from the crystal oscillator 101 is divided by the frequency divider 102 into signals of necessary frequencies; and the driving pulse generating circuits 103 and 104 generate the pulses reguired for driving the CCD 1. The thus obtained pulses are subjected to level shift and power amplification by the drive circuit 1 to match the voltage supplied from the power source circuit 106, and to drive the CCD 1.

When the switch 108 is connected to the terminal ②(second mode), the period setting circuit 107 produces a trigger pulse PT for determining the substantial integration period $T_l$, in response to a vertical blanking pulse VBLK produced from the divider 102. Also the ABG pulse control circuit 109 generates a control signal CABG for controlling the application of the anti-blooming gate pulses $\phi$ABG to electrode 2ABG, on the basis of the pulses PT and VBLK. The thus produced trigger pulse PT and the control signal CABG are applied to the second circuit 104 which in term produces the $\phi$I, $\phi$S and $\phi$ABG shown in FIG. 6, thereby obtaining the substantial integration period $T_1$ shorter than one field period 1V.

On the other hand, when the switch 108 is connected to the terminal ① (the first mode), the pulse PT is not produced from the circuit 107 and the signal CABG is consistently maintained at the L (low) level. Therefore, at this instant, the second circuit 104 generates the pulses $\phi$I, $\phi$S, and $\phi$ABG shown in FIG. 5, thereby obtaining the integration period corresponding to about one field period 1V.

The output of the CCD 1 is smoothed through the smoothing circuit 110; and the exposure control member 111 controls the quantity of incident light in accordance with the smoothed output.

Figure 9:
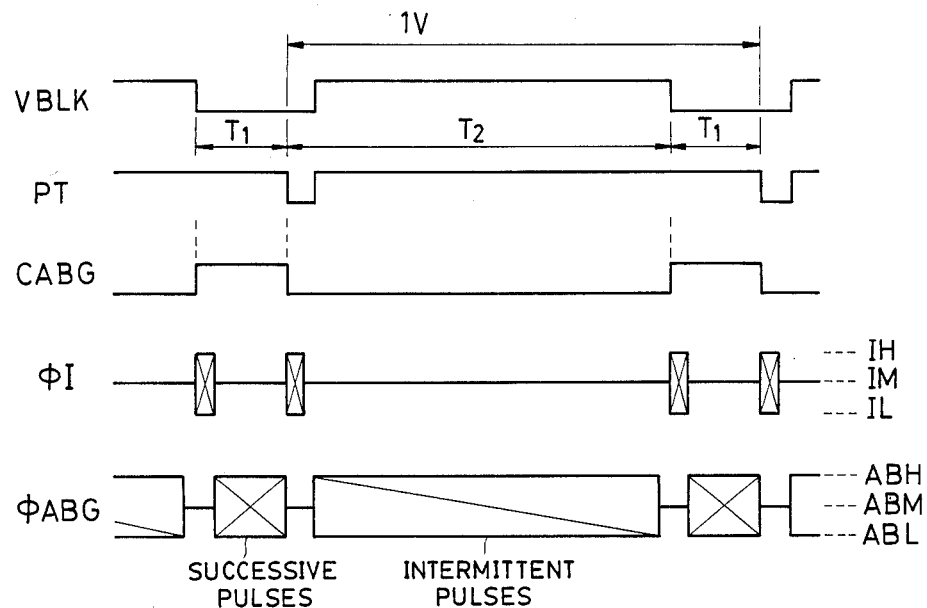
FIG. 9 is a timing chart for signals generated in the embodiment of FIG. 8.

FIG. 9 is a timing chart of signals generated in the circuit system shown in FIG. 8. The pulses PT and VBLK, which are respectively produced from the period setting circuit 107 and the frequency divider 102 to determine the substantial integration period $T_1$, cause the ABG pulse control circuit 109 to bring the signal CABG to the H (high) level during the the period $T_1$ and to the L (low) level during the period $T_2$. In response to this signal CABG, the second circuit 104 successively applies the pulses $\phi$ ABG to the electrode 2ABG during the period $T_1$ while intermittently applying the pulses $\phi$ABG to the same electrode 2ABG during the period $T_2$ (i e., only the horizontal blanking periods). As described above, the second driving pulse generation circuit 104 maintains the pulses $\phi$ABG at middle level ABM during the vertical transfer of the charges from the imaging part 2 to the storage part 3.

It is to be noted that while in the above described first embodiment use is made of a single-phase CCD of a frame-transfer type having an excess-charge eliminating structure utilizing charge recombination, the present invention can be adapted to other types of image pickup means on which the quantity of the charge accumulated in picture elements can be varied by changing the driving pulses.

As shown in FIG. 9, the substantial integration period $T_1$ is set within the interval of the vertical blanking period. It is advantageous to set the period $T_1$ within the vertical blanking period because the pulses $\phi$I and $\phi$S then come very close to the vertical blanking period and are not harmful to the resulting displayed image.

The vertical blanking period is 1.6 ms (milliseconds) in accordance with the PAL Standard and is about 1.3 ms in accordance with the NTSC Standard. Accordingly, when using the vertical blanking period, in the PAL system a high-speed shutter of about 1/600 seconds or higher can be obtained while in the NTSC system a high-speed shutter of about 1/750 seconds or higher can be obtained.

The first embodiment, as described above, is arranged in such a manner that the anti-blooming means in the image pickup means is intermittently operated during the integration period for accumulating unwanted charges which are to be eliminated and are not used, and is continuously operated during the substantial integration period for accumulating wanted charges.

The second preferred embodiment of the present invention will now be described in connection with FIGS. 10 through 13. This second embodiment is arranged in such a manner as to more efficiently eliminate the unwanted charges during the unwanted charge integration period $T_2$.

The second embodiment is characterized in that the accumulation quantity of the unwanted charges is limited in advance by reducing the maximum possible accumulation quantity of the unwanted charges in the imaging part 2 of the CCD 1 (FIG. 1) during the unwanted charge integration period as compared with that during the substantial integration period.

Figure 10:
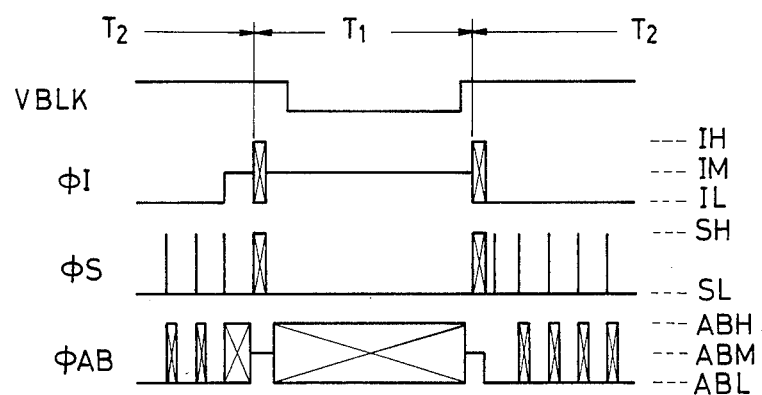
FIG. 10 is a timing chart for drive pulses and control signals generated in a second embodiment of the present invention.

FIG. 10 shows a timing chart of driving pulses generated in the second embodiment for limiting the maximum accumulation quantity of the charges in the imaging part 2 of the CCD 1 during the unused charge integration period.

In FIG. 10, vertical transfer pulses $\phi$I and $\phi$S substantially corresponding to the number of vertical picture elements or rows in the imaging part 2 are generated twice, that is, shortly before the beginning of the vertical blanking period and shortly after the vertical blanking period, thereby obtaining the shortened substantial integration period $T_1$. Also, the anti-blooming gate pulses $\phi$ABG are applied continuously during the period $T_1$ and are applied intermittently during the period $T_2$. In addition, in the second embodiment, during the accumulation of the unwanted charges, the level of the pulses $\phi$I is set not to the middle level 1M but instead to the low level 1L in order to increase the efficiency of the charge elimination through the regions ABG. This decreases the quantity of charges which remain in the picture elements in the imaging part 2.

Figures 11A, 11B:
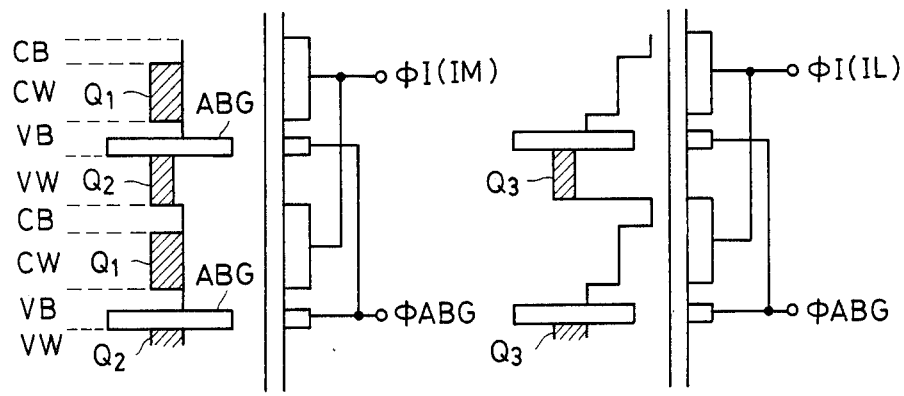
FIGS. 11(a) and 11(b) are schematic illustrations showing potential distributions in the imaging part of the CCD of FIG. 1 and corresponding to the drive pulses shown in FIG. 10.

The reason for this level setting will be explained with reference to FIGS. 11(a) and 11(b). FIGS. 11(a) and 11(b) show potential distributions in the imaging part 2 when the level of the pulse $\phi$I is at the level IM and IL respectively. In FIG. 11(a), the sum of the charges Q1 accumulated in each region CW and the charges Q2 accumulated in each region VW after the elimination of excess charge through the regions ABG becomes the maximum charge quantity. On the other hand, in FIG. 11(b) the sum of the charges Q3 accumulated in each region VW after the elimination of excess charges through the regions ABG becomes the maximum charge quantity. Apparently, the quantity of charges which remain at the end of the unwanted charge integration period $T_2$ is decreased more in FIG. 11(b) than in FIG. 11(a), thus reducing the quantity of charges which are to be eliminated by vertical transfer, and thereby decreasing the overflow of charge which takes place during the vertical transfer period of the charges at the beginning of the substantial integration.

Also, as is understood from the comparison between FIGS. 11(a) and 11(b), since the storage capacity of the imaging part 2 during the period $T_2$ is increased, it is possible to reduce the likelihood that the excess charges would overflow from the imaging part 2 to the storage part 3 and destroy the signal to be read out from the storage part 3.

Figure 12:
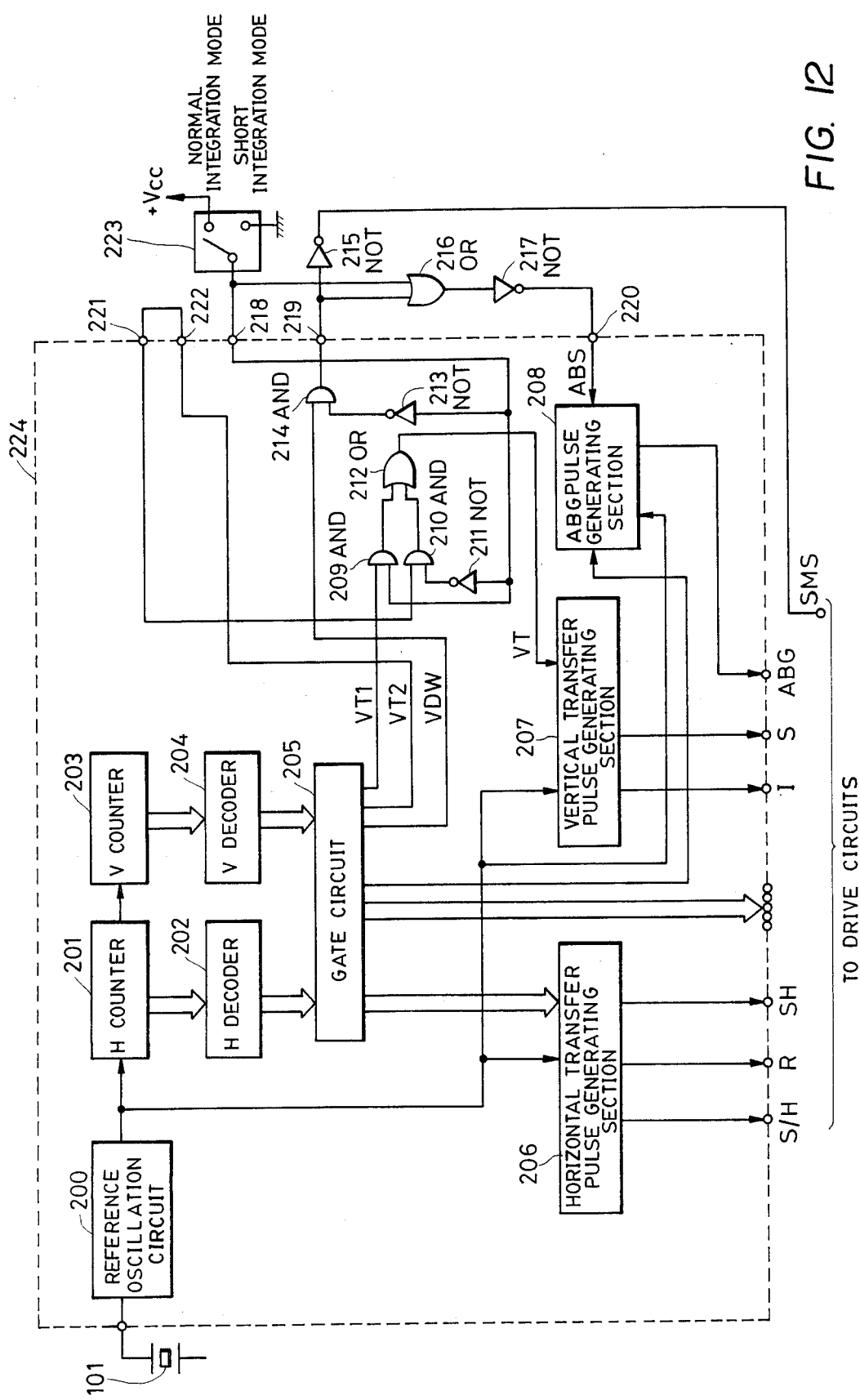
FIG. 12 is a block diagram of a second embodiment of the present invention.

A reference signal generating arrangement for generating the above discussed pulses and control signals is shown in FIG. 12. As can be seen, the signal generating arrangement of FIG. 12 includes circuits which correspond to the first and second driving pulse generating circuits, i.e. the period setting circuit 107 and the AB pulse control circuit 109 shown in FIG. 8. The arrangement of FIG. 12, includes a reference oscillation circuit 200 connected to the crystal oscillator 101. An H counter 201 is arranged for counting timings for one horizontal period in response to the output of the oscillation circuit 200. An H decoder 202 is connected to the H counter 201 and generates timing signals for the horizontal periods based on inputs from the H counter 201. A V counter 203 is also connected to the H counter 201 and counts the horizontal timing signals for each vertical period V in response to the carry output of the H counter 201. A V decoder 204 is connected to the V counter 203 and generates reguired horizontal timing signals in one vertical period based on the count output of the V counter 203. A gate circuit 205 is arranged to produce synthesized pulses based on the outputs of the decoders 202 and 204. A horizontal transfer pulse generating section 206 generates horizontal transfer reference pulses SH and R and sample-hold pulses S/H in response to outputs from the reference oscillator circuit 200 and the gate circuit 205. The above described horizontal register driving pulses $\phi T$ and reset-gate driving pulse $\phi R$ are respectively generated on the basis of the reference pulses SH and R through a horizontal drive circuit (not shown). (Each pulse generated by the gate circuit 2 will be described hereinafter with reference to FIG. 13.) A vertical pulse generating section 207 generates vertical transfer reference pulses I and S based on a signal VT which will be explained hereinafter. The above described vertical transfer pulses $\phi I$ and $\phi S$ shown in FIG. 10 are respectively generated on the basis of the reference pulses I and S through a vertical drive circuit (not shown). An ABG generating section 208 is arranged for generating the above described continuous or intermittent anti-blooming gate pulses $\phi ABG$ shown in FIG. 9 based on a control signal ABG described hereinafter.

AND gates 209, 210 and 214, NOT gates 211, 213, 215 and 217 and OR gates 212 and 216 are connected, as shown in FIG. 12, between the gate circuit 205, the vertical pulse transferring section 207 and an integration-mode selecting switch 223, an output terminal 219 and an input terminal 220 of the ABG pulse generating section 208. A control is delivered at the output terminal 219. The AND gate 210 has an input terminal 221 and the gate circuit 205 has an output terminal 222. The integration mode selecting switch 223 corresponds to the switch 108 shown in FIG. 8.

Symbol VT1 denotes a vertical transfer trigger signal in the normal integration mode and symbol VT2 denotes a vertical transfer signal in the short integration mode. The above noted pulses and signals will be described below with reference to FIG. 13, and the terms "normal integration mode" and "short integration mode", which are used below, correspond respectively to the normal integration period and the short integration period described above.

Figure 13:
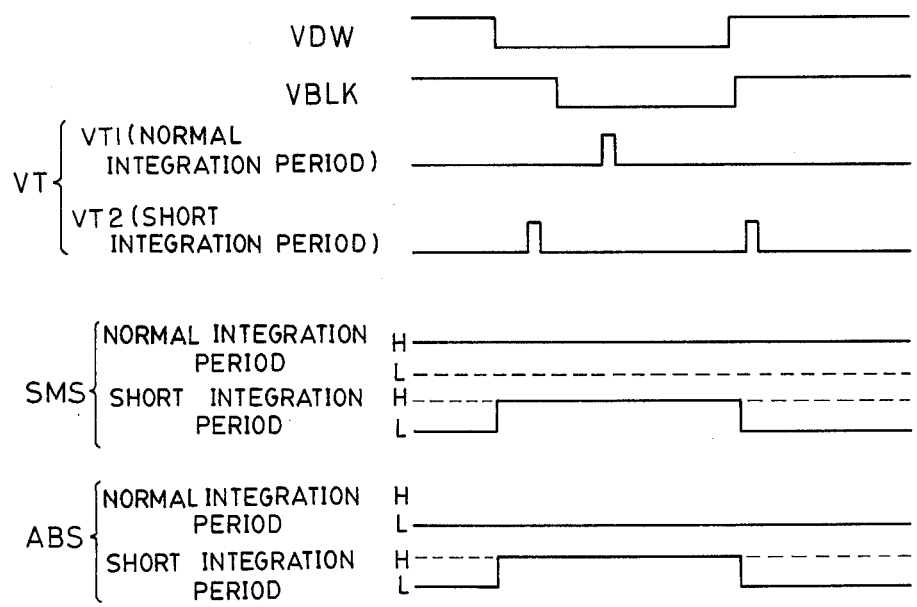
FIG. 13 is a timing chart for signals generated in the embodiment of FIG. 12.

Symbol VT denotes a vertical transfer trigger signal which corresponds to the trigger pulse PT referred to in the description of FIG. 8. The vertical charge transfer is triggered in response to the leading edge of this signal VT. This signal VT triggers a train of the vertical transfer pulses $\phi I$ and $\phi S$ (FIG. 10) once during the vertical blanking period in the normal integration mode and shortly before and shortly after the vertical blanking period in the short integration mode. A window pulse VDW, which is generated by the gate circuit 205, as shown in FIG. 13, has an L (low) level period long enough to contain the vertical blanking period (VBLK).

Symbol SMS denotes an integration mode selecting signal for selecting the integration mode of the CCD 1. The signal SMS consistently takes the H (high) level in the normal integration mode. In the short integration mode, the signal SMS takes the L (low) level, while the unwanted charges which are to be eliminated are being accumulated; and it takes the H level while the wanted charges which are to be read out and used are being accumulated. The vertical transfer pulses $\phi I$ (FIG. 10) to be applied to the imaging part 2 are controlled according to the level of the signal SMS in such a manner that the pulses $\phi I$ are maintained at the middle level IM when the signal SMS is at the H level; and are maintained at the L level IL when the signal SMS is at the L level, except for the vertical charge transfer periods. Symbol ABS denotes a anti-blooming selecting signal which corresponds to the control signal CABG explained above in connection with FIG. 8. The signal ABS takes the L level in the normal integration mode; and it takes the L level while the unwanted charges which are to be eliminated are being accumulated. The signal ABS also takes the H level while the wanted charges which are to be read out and used are being accumulated. The anti-blooming gate pulses $\phi ABG$ are controlled according to the level of the signal ABS in such a manner that the pulses $\phi ABG$ are continuously generated when the signal ABS is at the H level but are generated only during the horizontal blanking period when the signal ABS is at the L level. A is described herein before the pulses $\phi ABG$ are maintained at the middle level ABM during the vertical charge transfer.

The operation of the reference signal generating circuit system shown in FIG. 12 will be explained below with reference to FIG. 13

When the switch 223 is set to the normal integration mode, the input terminal 218 is set at the H level. Conseguently the AND gate 209 is enabled while the AND gates 210 and 214 are disabled through the NOT gates 211 and 213, respectively. In this condition, when the pulse VT1 shown in FIG. 13 is produced from the gate circuit 205, this pulse passes through the AND gate 209 and the OR gate 212, and is applied to the vertical transfer pulse generating section 207 as the vertical transfer trigger signal VT. On the basis of the signal VT, the vertical transfer pulse generating section 202 generates the vertical transfer pulses $\phi I$ and $\phi S$ in the normal integration mode. In this case, the output of the AND gate 214, i.e., the output terminal 219, is maintained at the L level and the integration mode selecting signal SMS is maintained at the H level through the NOT gate 215. Also the anti-blooming selecting signal ABS, which is applied to the ABG pulse generating section 208 through the input terminal 220, is maintained at the L level through the NOT gate 217. Therefore, the entire system operates in the normal integration mode.

In the normal integration mode, a train of vertical transfer pulses φI and φS is generated once during the vertical blanking period, and the transfer pulses φI to the imaging part 2 are maintained at the middle level IM during the whole period except for the vertical charge transfer period. The anti-blooming gate pulses φABG are applied to the electrodes 2ABG only during the horizontal blanking period, that is, trains of the pulses φABG are intermittently applied to the electrodes 2ABG.

Next, when the switch 223 is set to assign the short integration mode, the input terminal 218 is set at the L level. The AND gate 209 is thereby disabled while the AND gates 210 and 214 are enabled through the NOT gates 211 and 213, respectively. In this condition, when the pulse VT2 shown in FIG. 13 is produced from the gate circuit 205, this pulse passes through the output terminal 222, the input terminal 221, the AND gate 210 and the OR gate 212, and is applied to the vertical transfer pulse generating section 207 as the vertical transfer trigger signal VI. This causes the section 207 to generate the vertical transfer pulse φI and φS in the short integration mode. In this case, the window pulse VDW generated by the gate circuit 208 passes through the AND gate 214 and is delivered as the inversion signal of the integration mode selecting signal SMS at the terminal 219 and is then inverted into the signal SMS through the NOT gate 215. On the other hand, the output signal of the AND gate 214 passes through the OR gate 216, the NOT gate 215 and the input terminal 220; and is then delivered as the anti-bloooming selecting signal ABS to the ABG pulse generating section 208. In this manner, the entire system operates in the short integration mode. As can be understood, in the short integration mode, the vertical transfer pulses φI and φS are generated shortly before and shortly after the vertical blanking period. Also, in accordance with the L level of the selecting signal SHS, the pulses φI are maintained at the L level during the entire unwanted charge integration period except for the vertical charge transfer period. This thereby limits or decreases the quantity of charge which is accumulated in the imaging part 2 during the unwanted charge integration period. Also, according to the level of the signal ABS, the pulses φABG are applied to the electrode 2ABG only during the horizontal blanking period, i.e. in the unwanted charge integration period; and are continuously applied to the electrode 2ABG during the wanted charge integration period. This increases the ability to the apparatus to prevent the occurrence of blooming during the integration period for accumulating the wanted charges.

In accordance with the construction of the circuit system shown in FIG. 12, since both control signals ABS and SMS are formed through one common output (VDW) of the gate circuit 205, the number of signal lines for forming these control signals ABS and SMS can be reduced. This provides the advantage that when these signal lines are to be connected by pins to the other elements, the number of pins can be reduced.

Additionally, with the circuit construction shown in FIG. 12, the timing of the vertical charge transfer, that is, the wanted charge integration period $T_1$, can be easily changed. To attain this period the switch 223 is set to assign the short integration mode, the terminals 221 and 222 are disconnected from each other and a desired timing signal is delivered to the AND gate 210 through the terminal 221, thereby enabling the vertical charge transfer at any desired timing. This embodiment is also advantageous in this respect.

As can be seen from the timing chart in FIG. 10, the second embodiment differs from the first embodiment whose timing chart is shown in FIG. 9. Specifically, the timing is such that the vertical transfer pulses φI and φS substantially corresponding to the number of the vertical picture elements or rows in the imaging part 2 are generated once shortly before the vertical blanking period to transfer the unwanted charges from the imaging part 2 to the storage part 3 for elimination. In addition, the vertical transfer pulses φI and φS substantially corresponding to the number of the vertical picture elements or rows in the imaging part 2 are generated again shortly after the vertical blanking period in order to transfer the signal charges from the imaging part 2 to the storage part 3 for signal read-out.

Figure 14:
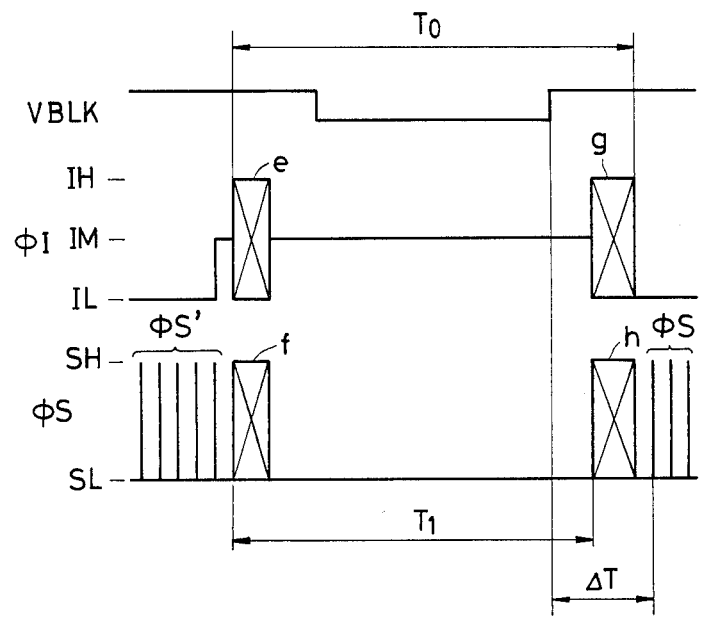
FIG. 14 is a detailed timing chart for analyzing a vertical transfer pulse represented in FIG. 10.

The vertical transfer pulses will be described in detail below with reference to FIG. 14 which is a timing chart illustrating in detail the vertical transfer pulses. As shown in FIG. 14, since a substantial integration period $T_1$ is longer than the vertical blanking period, noise is produced by the vertical transfer pulses for transferring the charges from the imaging part 2 to the storage part 3 and the noise thus produced affects an effective picture area on the screen. However, the uppermost and lowermost portions of the vertical scanning, i.e., about 9 percent of the whole in each case are concealed from an actual monitor, so that, if $T_1 = 3$ ms (milliseconds) or less in the PAL system and $T_1 = 2$ ms or less in the NTSC system, no problems occur in practical terms. Also, the period ΔT is an interval during which the vertical stepwise transfer pulses, shown by ΔS, appear to be absent due to the overlapping by the pulses ΔS shown at h, even though they are actually present, so that the quantity of image information transferred is correspondingly insufficient. In order to compensate for the shortfall, at least the transfer pulses h are increased by the number of pulses generated in ΔT/H (H=horizontal period). The other pulses e and f may both be increased in number, or they may be increased to equal the number of vertical lines. The sum of the vertical blanking period and several percent of the vertical scanning period is hereinafter referred to as an "approximate vertical blanking period". As shown in the timing chart in FIG. 14, the pulses e, f, g, and h are outputs before and after the vertical blanking periods, that is, during the approximate vertical blanking period. However, the approximate vertical blanking period may be constituted by the sum of the vertical blanking period and the adjacent period either before or after the vertical blanking period.

Also, in a driving method in which the vertical transfer pulses φI are maintained at the middle level IM during the entire period except for the vertical transfer period as shown in FIG. 6, the vertical charge transfer can be performed according to the timing shown in FIG. 14.

In this second embodiment, the anti-blooming gate regions ABG for the charge recombination are disposed in the virtual regions VB, so that the potential level of the clocked regions CW is made higher than that of the virtual regions VB from the viewpoint of the electrons in the region CW during the period $T_1$ as shown in FIG.

11(b). In a case where the anti-blooming gate regions ABG are disposed in the clocked regions CB or CW, the potential level of the clocked regions CB should made lower than that of the virtual regions VW from the viewpoint of the electrons in the regions CB during the period $T_1$.

Here, the circuit portion surrounded by broken line and indicated by 224 in the circuit system shown in FIG. 12 may be constructed in an integrated circuit (IC) chip. With this IC chip, a reference signal generating circuit system, which is capable of switching between the normal integration mode and the short integration mode, can be easily constructed by using a small number of externally mounted circuits.

In the above described second embodiment, use is made of single-phase frame-transfer type CCD which has an excess-charge eliminating structure using charge recombination, and the potential distribution in the imaging part of the CCD is varied depending upon drive conditions, so that the excess charges to be accumulated in picture elements can be limited during the unwanted-charge integration period.

Next, a third preferred embodiment of the present invention will be described below with reference to FIGS. 15 and 16.

Figure 15:
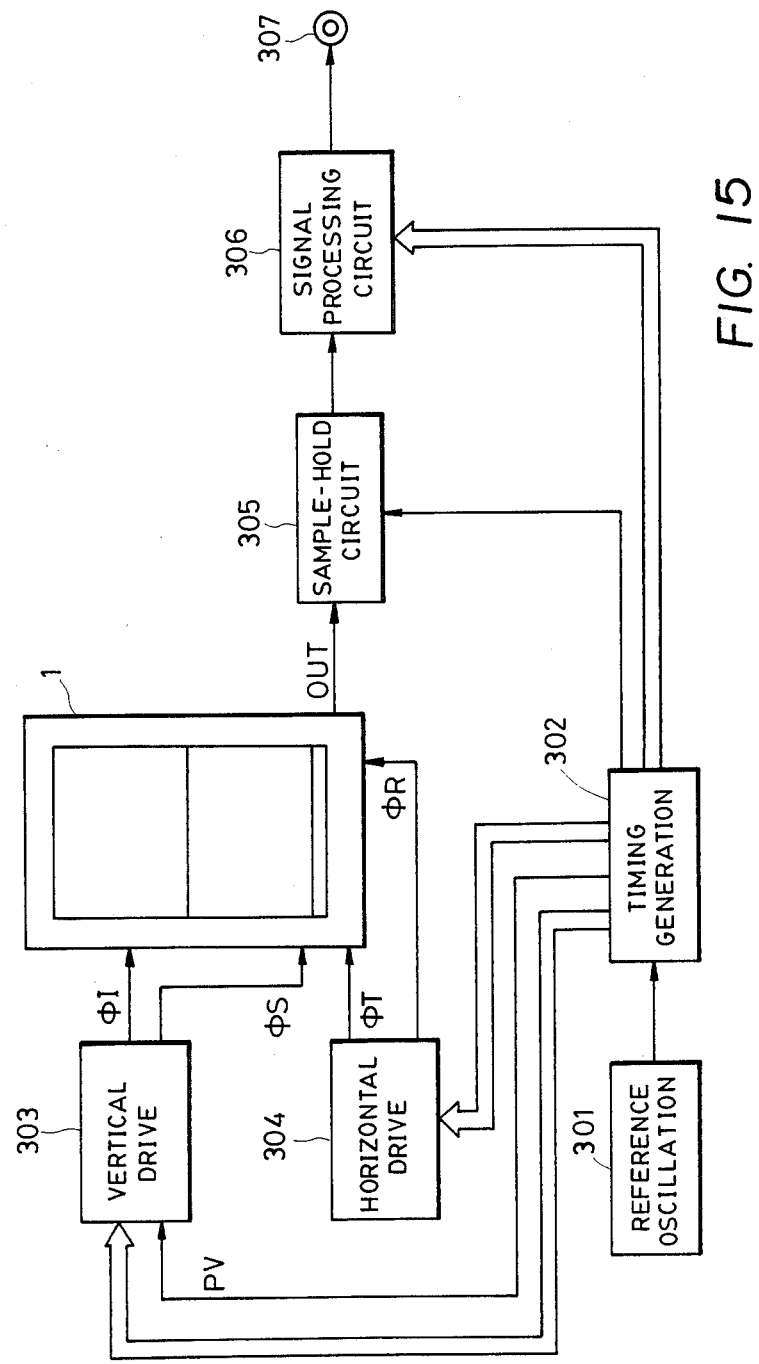
FIG. 15 is a block diagram of a circuit system of a third preferred embodiment of the present invention.

In FIG. 15, like reference numerals are used for the sake of simplicity of explanation to denote like or corresponding circuit elements which have the same functions as the respective elements mentioned in the above description of the preceding embodiments.

In the embodiment of FIG. 15, there is provided a reference oscillation circuit, a timing generating circuit 302 including counters, decoders or the like, a vertical drive circuit 303 for generating the vertical transfer pulses $\phi I$ and $\phi S$, a horizontal drive circuit 304 for generating the horizontal register driving pulses $\phi T$ and the reset-gate driving pulses, a sample hold circuit 305 for sampling and holding the output of the CCD 1 to convert same into a continuous signal, a signal processing circuit 306 containing a video processing circuit and an encoder or the like for processing a video signal, and a video output terminal 307 for outputting a video signal. The circuits 101, 302, 303 and 304 together constitute a control or drive circuit of the CCD 1.

The operation of this embodiment will be described below. The reference oscillation circuit 301 generates reference clock signal for a synchronizing signal and a driving pulse; and, in response to these reference clock pulses, the timing generating circuit 302 generates various pulses including a timing pulse for a driving pulse, a sample-hold pulse, a clamp pulse, a blanking pulse and synchronizing pulses. The vertical drive circuit 303 and the horizontal drive circuit 304 generate the $\phi I$, $\phi S$, $\phi T$ and $\phi R$ signals reguired for the vertical and horizontal transfers of the charges and the output reset in the CCD 1 on the basis of the pulses produced from the timing generating circuit 302. The sample hold circuit 305 converts the discontinuous outputs of the CCD 1 into continuous signals. The signal processing circuit 306 processes the output of the sample-hold circuit 305 in response to the synchronizing pulses produced from the timing generating circuit 302 and delivers, as the output signal, a video signal through the video output terminal 307 to the outside.

Figure 16:
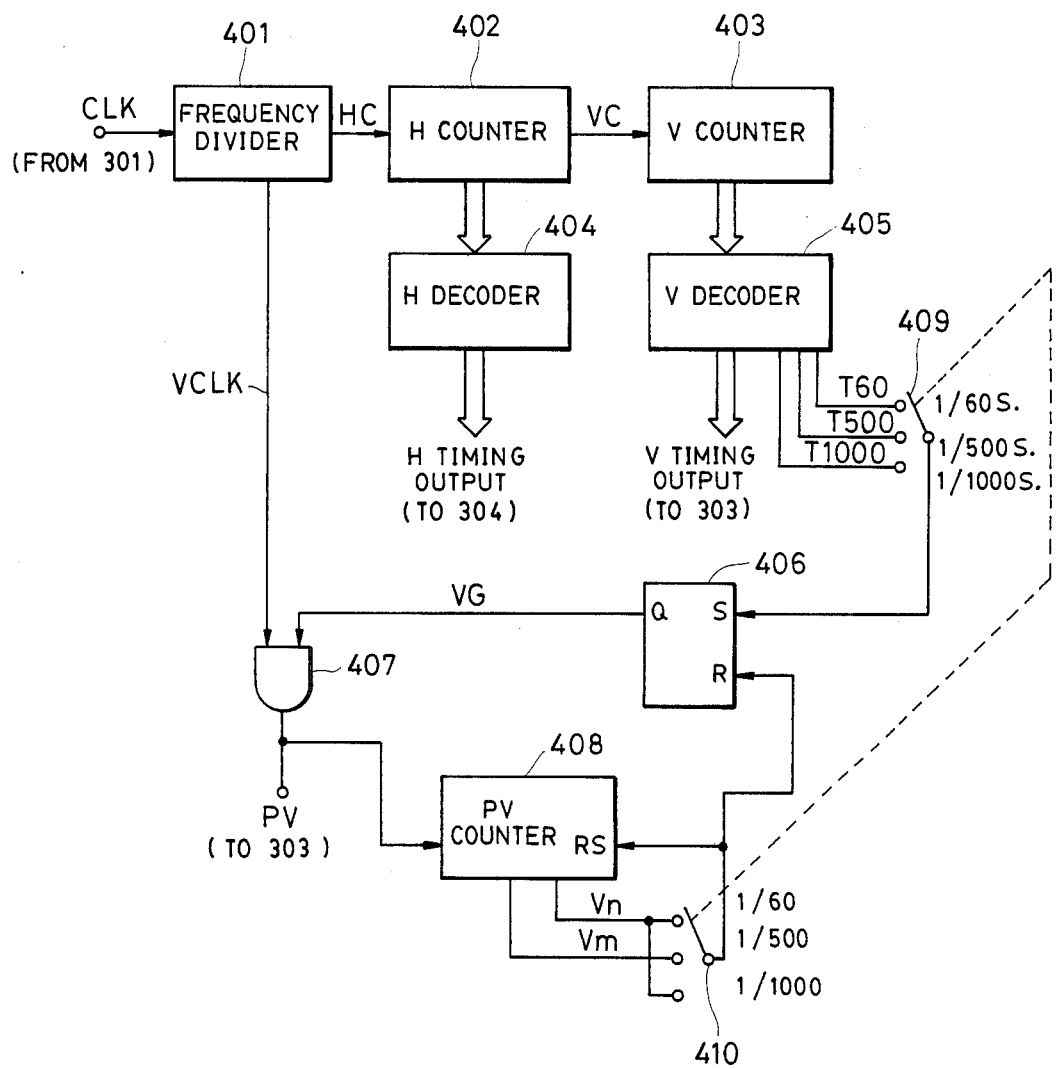
FIG. 16 is a block diagram of a portion of the timing generating circuit shown in FIG. 15.

FIG. 16 shows a portion of the timing generating circuit 302 in FIG. 15. As shown, there is provided a frequency divider 401, and H counter 402, a V counter 403, an H decoder 404, a V decoder 405, a set-reset flip-flop 406, an AND gate 407, a PV counter 408, and cooperative integration period selectors 409 and 410. The signal designations in FIG. 16 are as follows: CLK denotes a reference clock signal supplied from the reference oscillation circuit 301 in FIG. 15; HC denotes an H counter clock signal; VC denotes a V count clock signal T60 denotes a 1/60-second trigger pulse output; T500 denotes a 1/500-second trigger pulse output; T1000 denotes a 1/1000 second trigger pulse output; VG denotes a vertical transfer gate pulse generated as an output Q of the flip-flop 406; VCLK denotes a vertical transfer clock signal generated by the frequency divider 401; PV denotes vertical transfer pulses produced from the AND gate 407 and supplied to the PV counter 408 and the vertical drive circuit 303 in FIG. 15; Vn denotes an n vertical transfer reset pulse output; and Vm denotes an m vertical transfer rest pulse output.

Here, the H counter 402, the V counter 403 and the H decoder 404 have substantially the same construction and function as the H counter 201, the V counter 203 and the H decoder 202 in FIG. 12, respectively. Also, the V decoder 305 has a similar construction and function as the V decoder 204 in FIG. 12; but in this embodiment the V decoder is arranged to produce a timing pulse substantially synchronized with the center of the vertical blanking period as the output T60. The V decoder also produces a pair of timing pulses, respectively, shortly before the beginning of and shortly after the end of the vertical blanking period as the output T500, and a pair of timing pulses respectively, shortly after the beginning of and shortly before the end of the vertical blanking period as the output T1000. Also, the H decoder 404 produces an H timing output. The H and the V timing outputs of the H and the V decoders 404 and 405 are respectively supplied to the horizontal and the vertical drive circuits 304 and 305 in FIG. 15. The outputs T60, T500 and T1000 are selectable to the set input S of the flip-flop 406 through the selector 409. The PV counter counts the vertical transfer pulses PV supplied from the AND gate 407 and produces the reset pulse output Vn when it has counted n pulses PV (where n corresponds to the number of the lines or rows in the cell arrangement in the storage part 3). Also, the PV counter produces the reset pulse output Vm when it has counted m of the pulses PV (where m equals to n plus T3/TH). The outputs Vn and Vm of the PV counter 408 are selectable to the reset input R of the flip-flop 406 through the selector 410 which cooperates with the selector 409. The selected output Vn or Vm of the PV counter 408 is also adapted to be fed back to the counter 408 at its reset input RS to reset the same. As is shown in the figure, the selector 410 is arranged to select the output Vm of the PV counter 408 only when the selector 409 is selecting the output T500 of the V decoder 405.

In the above described construction, the frequency divider 407 produces the count clock pulses HC and the transfer clock pulses VCLK in response to the reference clock pulses CLK supplied from the oscillation circuit 301. The count clock pulses HC are counted by the H counter 402; and the H decoder 404 produces the H timing output on the basis of the count output of the H counter 402.

On the other hand, the count clock pulses VC produced from the H counter 402 at every predetermined count of the counter HC are counted by the V counter 403, and the V decoder 405 produces, on the basis of the count output of the V counter 403, the V timing output and the pulse outputs T60, T500 and T1000 at predetermined timings with respect to the vertical blanking pulse VBLK. When the flip-flop 406 is set by one of the outputs T60, T500 and T1000 selected by the selector 409, the output 2 of the flip-flop 406, that is, the vertical transfer gate pulse VG, becomes high and enables the AND gate 407. When enabled, the AND gate 407 passes the transfer clock VCLK therethrough to supply the transfer pulses PV to the drive circuit 303 and to the PV counter 408. The PV counter 408 produces the pulse outputs Vn and Vm at every n and m count of the transfer pulses PV. The selected one of the outputs Vn and Vm resets the flip flop 406 and makes its output Q low. Thereby, the transfer pulses PV are interrupted and the PV counter 408 is reset. Thus, n or m consecutive vertical transfer pulses PV are produced at the timing determined by the selected one of the outputs T60, T500 and T1000.

Figure 17:
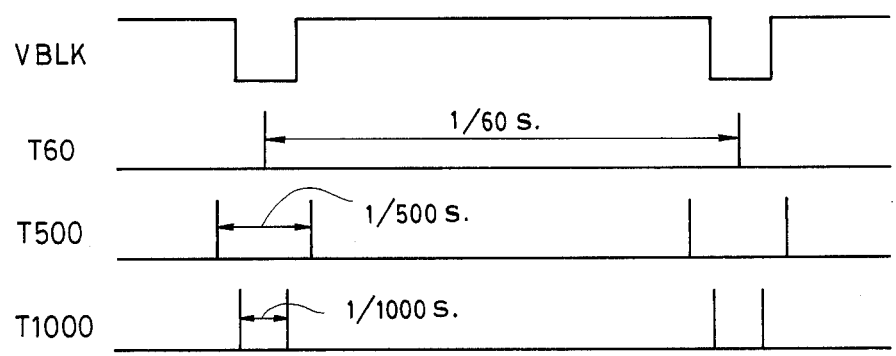
FIG. 17. is a timing chart for output pulses produced by the timing generating circuit shown in FIG. 16.

FIG. 17 shows the timing of the pulse outputs T60, T500 and T1000. The above-described transfer pulses $\phi I$ or $\phi S$ can be generated by selecting one of these three pulse outputs.

It is to be noted that, while only the timing of the outputs T60, T500 and T1000 are shown in FIG. 17, the vertical transfer pulses $\phi I$ and $\phi S$ for vertically transferring charges reguired for the signal read-out can actually be generated at the timings of the output T60, T500 or T1000.

It is a matter of course that while the above-described embodiments employ a single-phase frame-transfer type virtual phase CCD as a solid-state imaging device, the present invention may be practiced in other systems such as two-phase, three-phase, or four-phase frame-transfer CCDs or any other types in which charge is transferred and eliminated by high-speed transfer.

Moreover, although the embodiment shown in FIG. 16 selects integration periods of 1/500 and 1/1000 seconds, it is not limited thereto and other given periods are possible. Also, while the NTSC and PAL systems are described above, this invention can be adapted to other systems. While the embodiments described herein relate to an arrangement in which vertical transfer reguired for one read out is performed only two times in the approximate vertical blanking period, it will nevertheless be appreciated that such vertical transfer may be repeated two times or more. In this case, the period between the last vertical transfer and the penultimate vertical transfer becomes the effective integration period; and all the vertical transfers except the last one function to clear unwanted charge.

As will be easily understood from the foregoing description, in accordance with the above described embodiments, an image of the same quality as that of a system employing a mechanical shutter in an image pickup device is easily obtained by a completely electrical system. In addition, known solid-state imaging devices can be utilized without any modification.

In this case as well, even when the integration period of the imaging pickup means is shortened, improved anti-blooming ability and a proper image can be achieved. Blooming can also be effectively prevented without the need to especially increase power consumption.

It will also be understood that the foregoing disclosure of preferred embodiments of the present invention is for purposes of illustration only, and that the various structural and operational features disclosed may be modified and changed in a number of ways none of which involves any departure from the spirit and scope of the invention as defined in the hereto appended claims.

We claim:

1. An image pickup apparatus comprising:
   (a) converting means for converting an image into an electrical signal;
   (b) means operative in response to a control signal for preventing the saturation of said converting means;
   (c) driving means having a first mode which allows said converting means to eliminate said electrical signal and a second mode which allows said converting means to deliver said electrical signal to the outside of said image pickup apparatus as an electrical image signal; and
   (d) generating means for generating said control signal in accordance with said modes of said driving means, wherein said generating means has a first control mode in which said control signal is intermittently generated after said second mode and before said first mode and a second control mode in which said control signal is generated continuously after said first mode and before said second mode.

2. An image pickup apparatus according to claim 1, wherein said converting means has a CCD structure.

3. An image pickup apparatus according to claim 2, wherein said means for preventing the saturation of said converting means is an anti-blooming gate disposed in said CCD structure.

4. An image pickup apparatus according to claim 1, wherein said driving means is constructed to operate alternately in said first and second modes, and to shorten the period for producing said converted electrical signal which is delivered to the outside of said image pickup apparatus.

5. An image pickup apparatus according to claim 1, wherein said generating means is adapted to generate said control signal so as to increase the capacity of said saturation of said converting means in said first control mode more than in said second control mode of said generating means.

6. An image pickup apparatus according to claim 1, wherein said converting means has the function of accumulating said electrical signal.

7. An image pickup apparatus according to claim 6 further comprising a controlling means arranged to control the accumulation function of said converting means in accordance with said modes of said driving means.

8. An image pickup apparatus according to claim 7, wherein said controlling means is arranged to exert accumulation control in such a manner as to increase the accumulation capacity of said converting means more in said second control mode of said driving means than in said first control mode.

9. An image pickup apparatus according to claim 7, wherein said converting means has potential wells in which said electrical signal is accumulated and whose depth is variable.

10. An image pickup apparatus according to claim 9, wherein said accumulation function controlling means is adapted to control the depth of each potential well.

11. An image pickup system according to claim 1, further comprising signal processing means for forming a video signal from the electrical signal delivered from said converting means by said driving means.

12. An image pickup system according to claim 1, further comprising recording means for recording the electrical signal output from image pickup apparatus by said driving means.

13. An imaage pickup apparatus according to claim 1, wherein said apparatus includes means for changing the mode of said generating means to said first control mode as the mode of said driving means is changed to said second mode and then changed to said second control mode as said second mode of said driving means is finished.

14. An image pickup apparatus according to claim 1, wherein said apparatus includes means for changing the mode of said generating means to said second control mode as the mode of said driving means is changed to said first mode and then changed to said first control mode as the mode of said driving means is changed to said second mode.

15. A drive device for an image pickup apparatus having a converting means for converting an image into an electrical signal and a means for preventing the saturation of said converting means in response to a control signal, said drive device comprising:
(a) driving means having a first mode which allows said converting means to eliminate said electrical signal and a second mode which allows said converting means to deliver said electrical signal to the outside of said image pickup apparatus as an electrical image signal; and
(b) generating means for generating said control signal in accordance with said modes of said driving means, wherein said generating means has a first control mode in which said control signal is intermittently generated after said second mode and before said first mode and a second control mode in which said control signal is generated continuously after said first mode and before said second mode.

16. A drive device according to claim 15, wherein said driving means is constructed to operate alternately in said first and second modes and to shorten the period for producing said converted electrical signal which is delivered to the outside of said pickup apparatus.

17. A drive device according to claim 15, wherein said generating means is adapted to generate said control signal to increase the capacity of said saturation of said converting means more in said first control mode of said generating means than in said second control mode.

18. A drive device according to claim 17, wherein said drive device is constructed to drive an image pickup apparatus having an anti-blooming gate which prevents the saturation of said converting means in response to a control signal; and wherein said generating means is arranged to lengthen the period for applying said control signal to said anti-blooming gate in said second mode control more than in said first control mode.

19. An image pickup apparatus according to claim 15, wherein said apparatus includes means for changing the mode of said generating means to said second control mode as the mode of said driving means is changed to said first mode and then changed to said first control mode as the mode of said driving means is changed to said second mode.

20. An image pickup system according to claim 15, further comprising signal processing means for forming a video signal from the electrical signal delivered from said converting means by said driving means.

21. An image pickup system according to claim 15, further comprising recording means for recording the electrical signal output from said image pickup apparatus by said driving means.

22. An image pickup apparatus according to claim 15, wherein said apparatus includes means for changing the mode of said generating means to said first control mode as the mode of said driving means is changed to said second mode and then changed to said second control mode as said second mode of said driving means is finished.

23. An image pickup apparatus comprising:
(a) converting means for converting an image contained in one screen into a plurality of electrical signals, said converting means being constructed to produce said electrical signals within each field period of a standard television signal; and
(b) controlling means for transferring said eletrical signals for said one screen a plurality of times during each field blanking period.

24. An image pickup apparatus according to claim 23, wherein said converting means has an area type of CCD structure.

25. An image pickup apparatus according to claim 23, wherein each said field blanking period corresponds to a vertical blanking period of said standard television signal.

26. An image pickup apparatus according to claim 23, further comprising signal processing means for forming a video signal from part of said electrical signals transferred by said controlling means.

27. An image pickup apparatus according to claim 23, further comprising recording means for recording a part of said electrical signals transferred by said contolling means.

28. An image pickup apparatus according to claim 24, wherein said controlling means includes drive means for transferring said electrical signals to eliminate said electrical signals.

29. An image pickup apparatus comprising:
(a) converting means for converting an image contained in one screen into a plurality of electrical signals, said converting means being contructed to deliver said electrical signals within each field period of a standard television signal;
(b) storage means for storing said electrical signals for one screen; and
(c) controlling means for controlling said converting means and storage means, said controlling means transferring said electrical signals for one screen from said converting means to said storage means a plurality of times during each field blanking period.

30. An image pickup apparatus according to claim 29, wherein each field blanking period corresponds to a vertical blanking period of said standard television signal.

31. An image pickup apparatus according to claim 29, further comprising signal processing means for forming a video signal from part of said electrical signals transferred by said controlling means.

32. An image pickup apparatus according to claim 29, further comprising recording means for recording a part of said electrical signals transferred by said controlling means.

33. A drive device for a device having a converting means for converting an image contained in one screen into a plurality of electrical signals and a storage means for storing the electrical signals, said drive device comprising:

(a) first means for delivering said electrical signals within each field period of a standard television signal; and (b) second means for transferring said electrical signals a plurality of times within each field blanking period from the converting means to the storage means.

34. A drive device according to claim 33, wherein each said field blanking period corresponds to a vertical blanking period of said standard television signal.

35. A drive device according to claim 33, wherein said converting means has a CCD structure, and wherein said second means is arranged to transfer said electrical signal for one screen a plurality of times by driving said CCD.

36. A drive device according to claim 33, further comprising signal processing means for forming a video signal from a part of said electrical signals transferred by said second means.

37. A device according to claim 33, further comprising recording means for recording a part of said electrical signal transferred by said second means.

38. A method of producing an electrical signal from an optical image, said method comprising the steps of:
(a) exposing a charge accumulating image pickup means to an image in a first time period to accumulate a first electrical charge;
(b) clearing said first electrical charge from said image pickup means without generating an electrical signal;
(c) after said clearing, exposing said image pickup means to an image in a second time period to accumulate a second electrical charge;
(d) generating an electrical signal corresponding to said second electrical charge; and
(e) operating a charge reduction device to reduce the amount of charge accumulated by said image pickup means, wherein said charge reduction device is operated intermittently during said first time period and continuously during said second time period.

39. The method according to claim 38, wherein said charge reduction device is operated to produce a greater amount of charge reduction during said first time period then during said second time period.

40. The method according to claim 39, wherein said charge reduction device is a signal controlled anti-blooming means.

41. The method according to claim 40, wherein said image pickup means accumulates said electrical charges and said anti-blooming means prevents the charges from overflowing from said image pickup means.

42. The method according to claim 41, wherein said anti-blooming means prevents the charges from overflowing by erasing excess portions of the charges.

43. The method according to claim 42, wherein said anti-blooming means erases the excess portions of the charges by recombining the charges with holes.

44. The method according the claim 43, wherein the generation of said second electrical charge includes forming first potential wells at said image pickup means for accumulating the charges and wherein said clearing of said first electrical changes from said image pickup means includes forming second potential wells at said image pickup means which are different from said first wells.

45. The method according to claim 44, wherein said second wells are deeper than said first wells.

46. The method according to claim 38, wherein said step of accumulating an electrical signal corresponding to said second electrical charge is preceeded by the step of transferring the charges from said image pickup means to a charge storing means.

47. The method according to claim 46, wherein said step of generating an electrical signal corresponding to said second electrical charge comprises reading out the stored electrical charge from said charge storing means.

48. The method according to claim 38, further comprising the step of variably controlling said second time period.

49. The method according to claim 38, further comprising the step of repeatedly controlling said time periods so that the generated electrical signals substantially correspond to the field signals of a standard television system.

50. The method according to claim 49, wherein said step of repeatedly controlling said time periods includes controlling said second time period so that said second time period approximately corresponds to a vertical blanking period between two field signals.

51. The method according to claim 50, wherein step of repeatedly controlling said time periods further includes variably controlling said second time period.

52. The method according to claim 49, further comprising repetitively carrying out the recited sequence of steps.

53. A method according to claim 38, further comprising processing said electrical signal to form a video signal.

54. A method according to claim 38, further comprising recording said electrical signal.

55. An image pickup system comprising:
(a) image pickup means having; generation means for generating and accumulating an electrical charge in response to an optical image; and anti-blooming means which operates in responses to a control signal to reduce the charge accumulated by said generation means for preventing the signal from overflowing at said generation means; and
(b) drive means connected and arranged to provide a first control signal for clearing off the charge from said generation means, a second control signal for reading out the accumulated charge, a third control signal for operating continuously said anti-blooming means before the reading out the accumulated charge, and a fourth control signal for operating intermittently said anti-blooming means before the clearing off of the signal from said generation means.

56. The system according to claim 55, wherein said drive means is arranged to cause said anti-blooming means, with said third and said fourth control signals, to respectively operate so as to produce different amounts of accumulated charge reduction.

57. The system according to claim 56, wherein the amount of charge reduction produced by said fourth control signal is greater than that produced by said third control signal.

58. The system according to claim 55, wherein said generation means generates charges as the fourth electrical signal and said anti-bloooming means prevents the charges from overflowing at said generation means.

59. The system according to claim 58, wherein said anti-blooming means is constructed to prevent the charges from overflowing by erasing excess portions of the charges.

60. The system according to claim 59, wherein said anti-blooming means erases excess portions of the charges by recombining the charges with holes.

61. The system according to claim 60, wherein said drive means further provides fifth and sixth control signals together with said third and said fourth control signals to cause said generation means to respectively form first and second potential wells which are different from each other.

62. The system according to claim 61, wherein said second wells are deeper than said first wells.

63. The system according to claim 55, wherein said image pickup means further has storing means for temporarily storing the charge generated at said generation means and wherein said drive means is constructed and arranged to cause said image pickup means, with said first and said second control signals, to respectively transfer the charge from said generation means to said storing means.

64. The system according to claim 55, further comprising control means connected to said drive means to variably control a time interval between the clearing off of the charge from said generation means and the start of the reading out of the charge from said pickup means.

65. A method of producing a series of field video signals, comprising:
   (a) receiving an optical image with an image pickup element having a charge generation part for generating an electrical charge in response to the received image and a charge reducing part for reducing the generated charge from said generation part;
   (b) repeatedly reading out the charge from said pickup element at a time interval substantially corresponding to a field period of a field video signal;
   (c) clearing off the generated signal from said generation part of said pickup element prior to each reading out of the charge from said pickup element; and
   (d) operating intermittently said charge reducing part before said step of clearing off and operating continuously said charge reducing part before said step of reading out.

66. An image pickup system according to claim 55, further comprising signal processing means for forming a video signal from said charge read out by said second control signal.

67. An image pickup system according to claim 55, further comprising recording means for recording a signal read out by said second control signal.

68. The method according the claim 65, wherein the charge reduction before said step of clearing is greater than the charge reduction before said step of reading out.

69. The method according to claim 65, wherein said intermittent operation of said charge reducing part includes operating said charge reducing part substantially during each horizontal blanking period in the field video signal.

70. The method according to claim 65, further comprising the step of forming at said generation part of said pickup element, first and second potential wells different form each other before said clearing and before and said reading out, to accumulate the generated signal.

71. The method according to claim 70, wherein the total capacity of signal accumulation of said first well is larger than that of said second well.

72. The method according to claim 65, further comprising the step of variably controlling the interval between said clearing off and the start of the subsequent reading out.

73. The method according to claim 65, further comprising the step of controlling the timing of said clearing off so that the time interval between said clearing off and the start of the next signal read-out approximately corresponds to a vertical blanking period between two field video signals.

74. The method according to claim 73, wherein said step of controlling includes controlling said time interval variably.

75. A method of producing a series of field video signals, comprising:
   (a) receiving an optical image with an optical image pickup element having a signal generation part for generating an electrical signal in response to the received image;
   (b) repeatedly reading out the signal from said pickup element at a time interval substantially corresponding to a field period of the field video signals;
   (c) clearing off the generated signal from said generation part of said pickup element prior to each read-out of the signal from said pickup element; and
   (d) controlling at least the timing of said clearing off so that the time interval between said clearing off and the start of the next signal read-out approximately corresponds to a vertical blanking period between two field video signals.

76. The method according to claim 75, further including the step of controlling said time interval variably.

77. An image pickup system comprising:
   (a) image pickup means having generation means for generating and accumulating an electrical signal in response to an optical image;
   (b) drive means for driving said image pickup means to periodically read out the signal from said pickup means at a time interval substantially corresponding to a field period of a field video signal, said drive means driving said pickup means to clear off the signal from said generation means prior to each read-out of the signal; and
   (c) control means connected to said drive means to control at least the timing of said signal clearing off so that the time interval between the signal clearing off and the start of the next signal read-out approximately corresponds to a vertical blanking period between two succesive field video signals.

78. The system according to claim 77, wherein said control means includes means for controlling said time interval variably.

79. The system according to claim 78, further comprising designation means for designating a predetermined time interval to said control means.

80. An image pickup system according to claim 77, further comprising signal processing means for forming a video signal from said signal read out by said drive means.

81. An image pickup system according to claim 77, further comprising recording means for recording said signal read out by said drive means.

82. An image pickup apparatus for generating an image signal in a standard television cycle, comprising:
   (a) converting means for converting an image into electrical signals, said converting means including a plurality of converting elements; and
   (b) means for reading out said electrical signal from said plurality of converting elements, said reading out means being adapted to read out said electrical signals from said plurality of elements a plurality of times within a field blanking period of said standard television cycle.

83. The apparatus according to claim 82, wherein said read-out means includes means for discarding selected ones of said electrical signals read out by said read-out means as unnecessary signals, while the others are output to the outside of said apparatus in said standard television cycle.

84. The apparatus according to claim 83, wherein said discarding means discards at least the first signal read out by said read-out means.

85. The apparatus according to claim 82, wherein said converting means includes a CCD structure.

86. An image pickup apparatus according to claim 82, furhter comprising signal processing means for forming a video signal from a part of said electrical signals.

87. An image pickup apparatus according to claim 82, further comprising recording means for recording a part of said electrical signals.

88. An image pickup apparatus comprising converting means having a plurality of converting elements adapted to convert an optical image to an electrical signal, and output means for outputting said electrical signal from said converting means in a standard television cycle, said output means being constructed to have a substantial accumulating period for generating an electrical signal output in said standart television cycle which corresponds to the vertical blanking period of said standard television cycle.

89. The image pickup apparatus according to claim 88, further comprising:
   reading out means for reading out said electrical signal from said plurality of converting elements, said readout means being adapted to read out said electrical signal from said plurality of converting elements a plurality of times during said vertical blanking period.

90. The image pickup apparatus according to claim 89, wherein said reading out means includes means for effecting a read-out during at least the first read-out among said plurality of read-outs so as to discard said electrical signal.

91. The image pickup apparatus according to claim 88, wherein said converting means has a CCD structure.

92. An image pickup apparatus comprising:
   (a) image pickup means for periodically forming field signals from an optical image;
   (b) control means for variably controlling an accumulation period of said image pickup means, said control means being constructed and arranged to allow said accumulation period to approximately correspond to a field period in a first mode of said control means and a second mode which allows said accumulation period to substantially correspond to a field blanking period.

93. An image pickup apparatus according to claim 92, wherein said control means is constructed to control said accumulation period of said image pickup means within said field blanking period in said second mode.

94. An image pickup apparatus according to claim 93, wherein said accumulation period in said second mode is 1/1000 second.

95. An image pickup apparatus according to claim 92, wherein said image pickup means includes an imaging part for receiving said optical image and converting the same into said electrical signal, and a light-shielded storage part for storing said electrical signal.

96. An image pickup apparatus according to claim 95, wherein said image pickup means is adapted for transferring said electrical signal from said imaging part to said storage part during a field blanking period.

97. An image pickup apparatus according to claim 96, wherein said control means is adapted to clear off said electrical signal of said imaging part in advance of the transfer by said image pickup means.

98. An image pickup apparatus according to claim 97, wherein said control means is adapted to conduct the clearing during a field blanking period.

99. An image pickup apparatus according to claim 98, wherein said control means is adapted to clear off said electrical signal by transferring said electrical signal to said storage part.

100. An image pickup apparatus according to claim 98, wherein said imaging part and said storage part include CCD's, respectively.

101. An image pickup apparatus according to claim 100, wherein said image pickup means is adapted to periodically form field signals with a period which coincides with the period of a standard television signal.

102. An image pickup apparatus according to claim 101, wherein said field blanking period coincides with the vertical blanking period of said standard television signal.

103. An image pickup apparatus according to claim 92, further comprising signal processing means for forming a video signal from field signals of said image pickup means.

104. An image pickup apparatus according to claim 92, further comprising recording means for recording field signals of said image pickup means.

105. An image pickup apparatus comprising:
   (a) image pickup means including an imaging part for converting an optical image into an electrical signal and a storage part for storing said electrical signal; and
   (b) control means for periodically transferring said electrical signal from said imaging part to said storage part and for reading the electrical signal stored in said storage part in a predetermined period, said control means being further adapted for clearing said electrical signal from said imaging part after the completion of said predetermined period and before the start of the next transfer.

106. An image pickup apparatus according to claim 105, further comprising selection means for enabling the clearing off of said electrical signal to be conducted selectively.

107. An image pickup apparatus according to claim 105, wherein said control means is adapted to transfer said electrical signal within a period which conicides with the field period of a standard television signal.

108. An image pickup apparatus according to claim 105, wherein said control means is adapted to clear off said electrical signal by trnasferring said electrical signal to said storage part.

109. An image pickup apparatus according to claim 108, wherein said imaging part and said storage part include CCD's, respectively.

110. An image pickup apparatus according to claim 105, further comprising signal processing means for forming a video signal at each field period from said electrical signal read out by said control means.

111. An image pickup apparatus according to claim 105, further comprising recording means for recording said electrical signal read out by said control means.

112. An image pickup apparatus comprising:

(a) image pickup means including an imaging part for converting an optical image into an electrical signal and a storage part for storing said electrical signal;

(b) signal generating means for periodically generating a field blanking period signal at a time interval corresponding to the field period of a standard television signal; and (c) control means for clearing the electrical signal from said imaging part in advance of said field blanking signal, and for transferring to said storage part the electrical signal accumulated in said imaging part after the clearing, after the end of said field blanking period.

113. An image pickup apparatus according to claim 112, further comprising recording means for reading out the electrical signal transferred to said storage part and recording the read out electrical signal.

* * * * *

UNITED STATES PATENT AND TRADEMARK OFFICE
CERTIFICATE OF CORRECTION

PATENT NO. : 4,782,394            Page 1 of 3

DATED : November 1, 1988

INVENTOR(S) : Hieda, et al.

It is certified that error appears in the above-identified patent and that said Letters Patent is hereby corrected as shown below:

[57] ABSTRACT
    Line 12, change "according" to --according to--.

COLUMN 1
    Line 48, change "thataa" to --that a--; and
    Line 53, change "$CCD_3$" to --CCD's--

COLUMN 2
    Line 46, change "signal" to --signal.--.

COLUMN 6
    Line 6, change "seguentially" to --sequentially--.

COLUMN 7
    Lines 2 and 8, change "IV" to --1V--; and
    Line 23, change "Subseguently" to --Subsequently--.

COLUMN 9
    Line 7, change "reguired" to --required--; and
    Line 15, change "Tl," to --T1,--.

COLUMN 11
    Line 28, change "reguired" to --required--.

COLUMN 12
    Line 33, change "denotes a" to --denotes an--;
    Line 54, change "conseguently" to --consequently--.

COLUMN 15
    Line 3, change "should" to --should be--; and
    Line 57, change "sample hold" to --sample-hold--.

COLUMN 16
    Line 6, change "signal" (second occurrence) to --signal;--.

UNITED STATES PATENT AND TRADEMARK OFFICE
CERTIFICATE OF CORRECTION

PATENT NO. : 4,782,394

DATED : November 1, 1988

INVENTOR(S) : Hieda, et al.

It is certified that error appears in the above-identified patent and that said Letters Patent is hereby corrected as shown below:

<u>COLUMN 17</u>
  Line 43, change "guired" to --quired--.

<u>COLUMN 19</u>
  Line 54, change "mode control" to --control mode--.

<u>COLUMN 20</u>
  Line 53, change "each" to --each said--.

<u>COLUMN 22</u>
  Line 35, change "having;" to --having--;
  Line 38, change "responses" to --response--; and
  Line 47, change "out" to --out of--.

<u>COLUMN 23</u>
  Line 62, change "form" to --from--; and delete "and" (second occurrence).

<u>COLUMN 24</u>
  Line 66, change "signal" to --signals--.

UNITED STATES PATENT AND TRADEMARK OFFICE
CERTIFICATE OF CORRECTION

PATENT NO. : 4,782,394

DATED : November 1, 1988

INVENTOR(S) : Hieda, et al

It is certified that error appears in the above-identified patent and that said Letters Patent is hereby corrected as shown below:

COLUMN 25
Line 16, change "furhter" to --further--; and
Line 28, change "standart" to --standard--.

Signed and Sealed this

Eleventh Day of June, 1991

Attest:

HARRY F. MANBECK, JR.

Attesting Officer     Commissioner of Patents and Trademarks